United States Patent [19]

Lanham et al.

[11] Patent Number: 5,070,997
[45] Date of Patent: Dec. 10, 1991

[54] GRID BURN-OFF UNIT FOR BAKERY OVEN

[75] Inventors: William E. Lanham, Conyers; Dennis Hall, Rex, both of Ga.

[73] Assignee: APV Baker Inc., Atlanta, Ga.

[21] Appl. No.: 489,700

[22] Filed: Mar. 7, 1990

[51] Int. Cl.⁵ .......................................... B65G 45/10
[52] U.S. Cl. .................................. 198/494; 198/496; 99/443 C
[58] Field of Search .......................... 198/494–497, 198/499; 99/443 C; 432/75, 50

[56] References Cited

U.S. PATENT DOCUMENTS

| | | | |
|---|---|---|---|
| 2,083,864 | 6/1937 | Puckett | 198/496 |
| 3,229,808 | 1/1966 | Olson | 198/496 |
| 3,256,803 | 6/1966 | Nelson | 99/443 C |
| 4,182,444 | 1/1980 | Fisher | 198/497 |
| 4,960,200 | 10/1990 | Pierce | 198/496 |

FOREIGN PATENT DOCUMENTS

| | | | |
|---|---|---|---|
| 562471 | 6/1977 | U.S.S.R. | 198/495 |
| 604764 | 4/1978 | U.S.S.R. | 198/494 |

*Primary Examiner*—Joseph E. Valenza
*Attorney, Agent, or Firm*—Pasquale A. Razzano

[57] ABSTRACT

A bakery oven system is disclosed which includes a bakery oven through which an endless conveyor may pass that carries bakery products to be treated in the oven. The conveyor includes a conveyor section located out of the oven and adapted to pass through a grid burn-off unit which serves to clean the grid on the conveyor. The grid burn-off unit includes a separate enclosure having a burner arrangement for applying heat to the conveyor to burn off residue on the conveyor. A plurality of brushes are located downstream of the burn-off enclosure, in the direction of travel of the conveyor, to clean carburized material off of the conveyor.

22 Claims, 4 Drawing Sheets

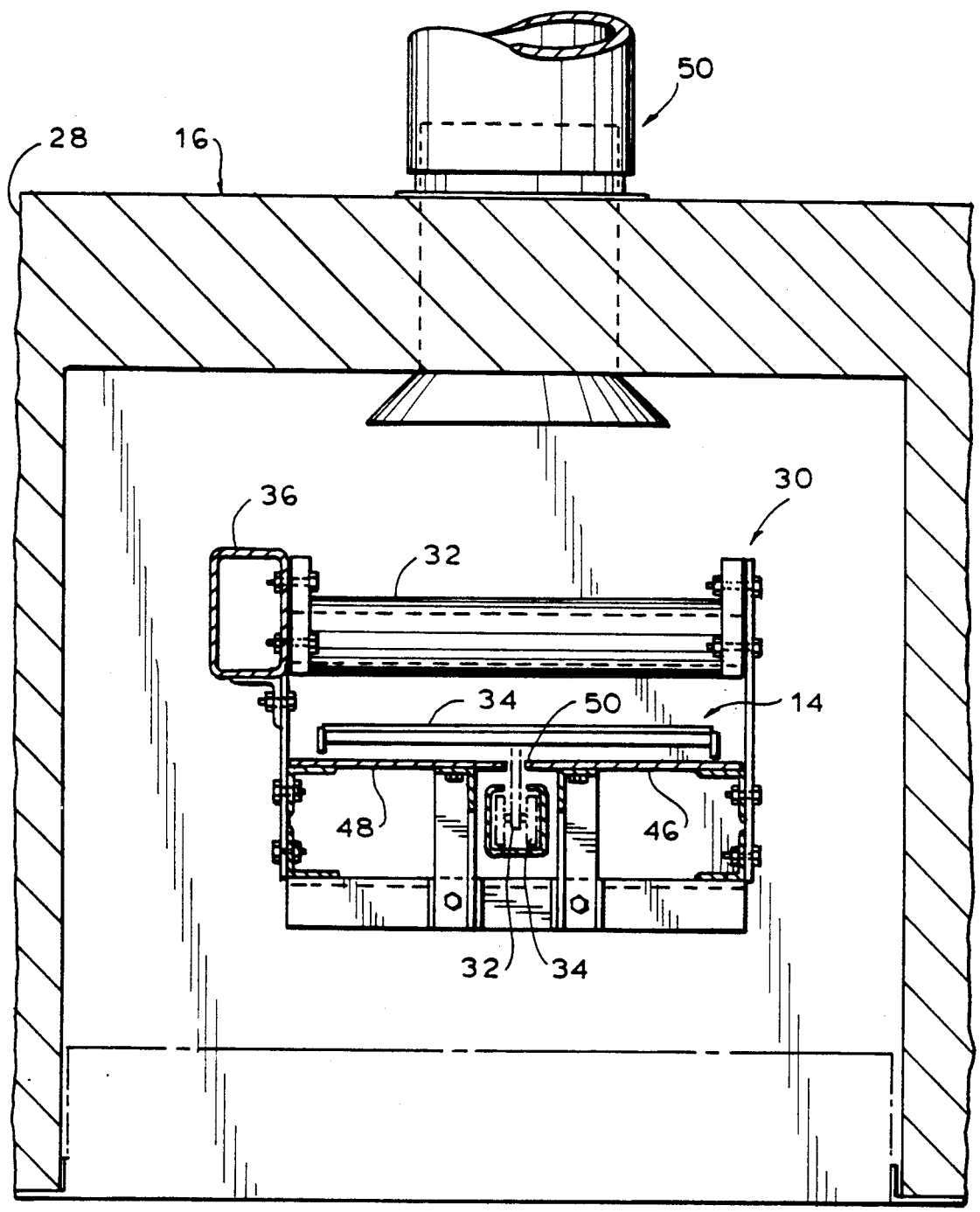
F I G. 2

GRID BURN-OFF UNIT FOR BAKERY OVEN

The present invention relates to commercial bakery ovens, and more particularly to an oven grid cleaning unit for cleaning the conveyors used in handling bakery products.

BACKGROUND OF THE INVENTION

In modern bakery operations, conveyorized ovens are utilized for baking bread and other dough products in order to transport the bakery products through the oven on a continuous basis. The conveyor typically is a single continuous conveyor extending through the oven, and perhaps other bakery operations. In the baking process, the conveyor becomes soiled with dough and other baking materials. In addition, portions of the conveyor may become soiled with bakery oils. This necessitates the cleaning of the conveyor units for sanitary purposes.

A typical bakery conveyor of the type presently predominating bakery industry consists of a centrally supported drive chain on which are mounted a plurality of wire grids having a generally sinusoidal shape. Such conveyors are disclosed for example in U.S. Pat. Nos. 3,680,493, 4,726,766; and 4,514,167. These conveyors generally include the center drive and support chain mentioned above, which travels in a support tube. The center chain, the support wheels on the chain riding in the tube, and the surfaces of the wire grid, may all become contaminated with various materials encountered within the oven environment, and must be cleaned. In the past such cleaning has been attempted by rinsing the conveyor in detergent and water, as shown in U.S. Pat. No. 3,680,493. However, this has not been entirely satisfactory.

It is an object of the present invention to provide an oven grid and conveyor cleaning system which can be adapted to be operated without shutting down the bakery unit.

Another object of the present invention is to provide an improved bakery conveyor cleaning unit which can be selectively operated as required.

A further object of the present invention is to provide an improved bakery oven conveyor cleaning system which economical to manufacture and efficient in operation.

Yet another object of the present invention is to provide an improved bakery oven conveyor cleaner unit.

SUMMARY OF THE INVENTION

The present invention relates to a bakery oven system and a unit for cleaning the conveyor in the oven system. The bakery oven includes an enclosure and an endless conveyor having support grids for conveying bakery products through the oven. The conveyor has a section which is located outside of the oven and which passes through the cleaning unit.

The cleaning unit includes a burn-off enclosure adjacent the oven and which contains means for applying heat to the conveyor for burning residue off the conveyor and the grids thereon. A brush arrangement is provided downstream of the grid burn-off enclosure to brush carburized material off of the conveyor chain and grids.

By this construction, the bakery conveyor can be continuously or selectively cleaned, even as it operates in its normal manner to carry bakery products to the oven. Thus, baked products may be removed from the conveyor before entering the burn-off unit. As the conveyor passes through the burn-off unit, residue on it is carburized and then brushed away in the downstream brush unit. From there, the conveyor can pass back to a loading station at which bakery products can be placed on the conveyor for passage into and through the oven. As a result, the cleaning process does not interfere with operation of the oven. However, it usually is only necessary to clean the conveyor during the usual oven "down time" periods set aside by bakery operators for routine maintenance.

The above, and other objects, features and advantages of this invention will be more fully understood from the ensuing detailed description of a preferred embodiment thereof which is to be read in connection with the accompanying drawings wherein:

DESCRIPTION OF THE DRAWINGS

FIG. 2 is a sectional view of the grid burn-off unit taken along line 2—2 of FIG. 1;

Figure 1:
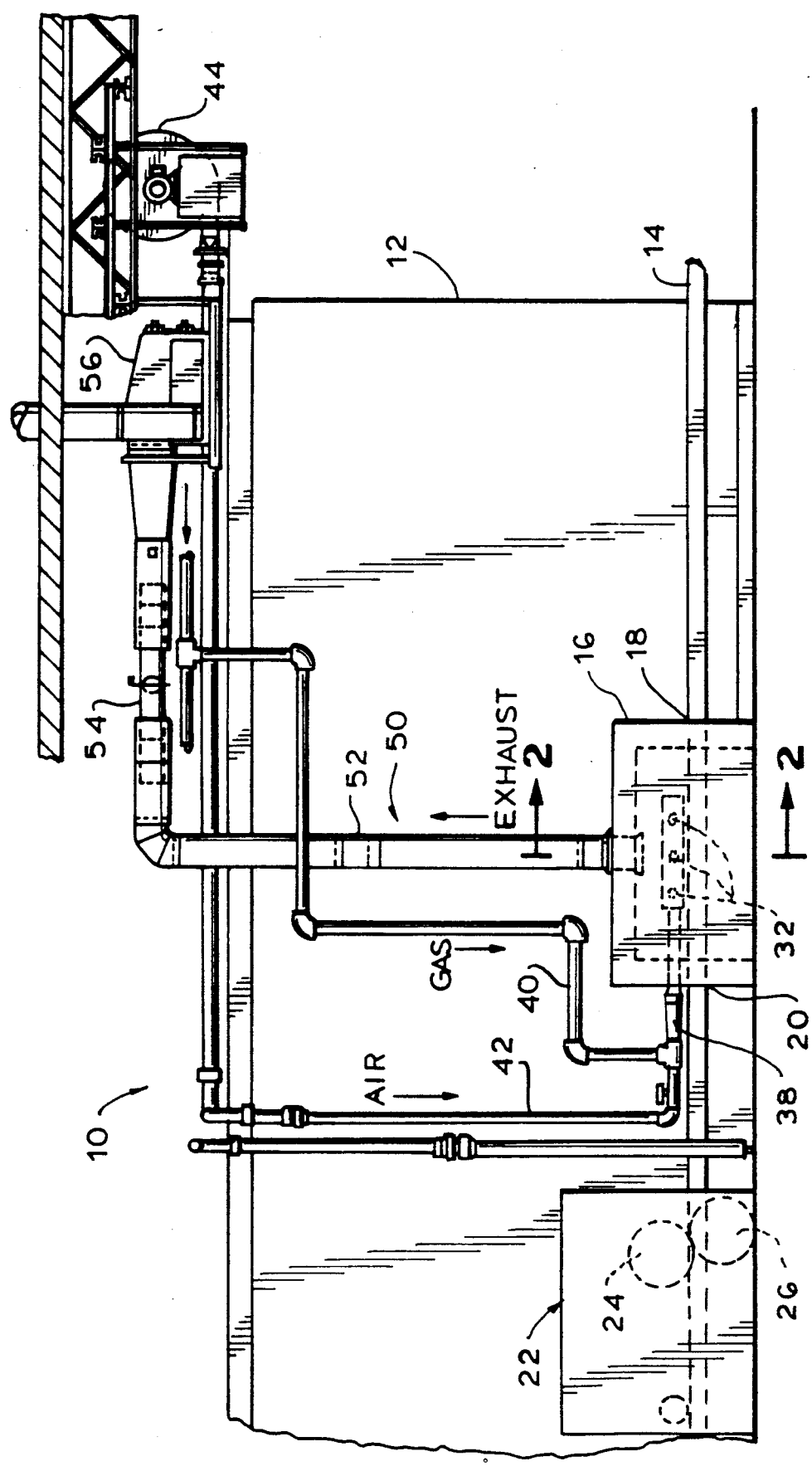
FIG. 1 is a side elevational view of a bakery oven system constructed in accordance with the present invention.

Referring now to the drawings in detail, and initially to FIG. 1 thereof, a bakery oven system 10 constructed in accordance with the present invention is illustrated. The basic construction of the oven and conveyor system of the present invention is well known in the art. The oven is basically the well-known oven and conveyor system sold by the Lanham Machinery Company as the "Lanham Proof N' Bake" system. This system is described, for example, in U.S. Pat. No. 3,680,493. It includes an insulated bakery oven enclosure 12 and a center chain support conveyor 14 having a plurality of bread pan supporting wire grids mounted thereon. In the previous Lanham system shown in U.S. Pat. No. 3,680,493, the conveyor was cleaned by passing the chain and conveyor grids through a liquid bath of detergent and water. That arrangement is improved upon and replaced in the present invention by the use of high heat intensity cleaning.

In accordance with the present invention, a portion of the path of travel of the conveyor 14 is located outside of the oven enclosure 12. The conveyor is directed to pass through a separate insulated enclosure 16 containing the grid burn-off unit described hereinafter. The unit includes an inlet opening 18 and an outlet opening 20 through which the conveyor passes. Downstream of the grid burn-off unit 16 a brush unit 22 is located. The brush unit 22 includes a pair of roller brushes 24, 26 which are positioned to engage the conveyor and brush carburized residue from the grid and chain.

Referring now more particularly to FIGS. 1 and 2, the grid burn-off unit 16 includes an insulated housing 28 of any convenient construction. The housing contains the arrangement 30 (illustrated in FIG. 2) for applying high heat intensity to the conveyor. As seen therein, the conveyor 14, whose drive chain 32 is illustrated in phantom lines, passes through the unit 30 with the chain contained within the center support tube 34. The unit 30 has three burners 32 mounted therein transversely of the path of travel of the conveyor grids 35.

These burners are supplied with a gas and air mixture from a manifold 36 forming part of the unit.

The burners 32 are high heat intensity burners such as are available from the Flynn Burner Company. These burners preferably have a maximum firing rate per unit of 540,000 BTUs per hour.

The combustible mixture of air and gas is supplied to the manifold 36 through the unimixer 38 located outside of the enclosure 16. Gas is supplied to the unimixer through a conduit 40 and air is supplied through a conduit 42. Preferably, the gas supply system has a conventional maxon gas valve and is complete with all appropriate safety devices as are known in the industry. The air supply system includes a separate dedicated combustion blower 44 for supplying high volumes of air at increased pressure to the unimixer.

In order to obtain the maximum effect of the high intensity heat supplied to the conveyor grids within the enclosure 16, a heat reflector arrangement 46 is provided beneath the path of travel of the conveyor 14. This arrangement consists of a steel plate 48 mounted below the conveyor grids 35 within the enclosure 16, and directly beneath the burners 32. The plate has a slot 50 formed therein to permit the support for the conveyor to pass through the plate.

The enclosure 16 has an independent exhaust system 50 connected thereto for discharging the products of combustion and excess heat from the enclosure. This exhaust system includes discharged ducting 52 which contains a manually operated damper 54 for controlling exhaust from the enclosure 16. The duct work may include an exhaust fan 56 and an air flow switch (not shown) controlling the fan to provide proper exhaust flow.

By this arrangement, when the conveyor 14 passes through the enclosure 16, a very high intense heat is applied to the conveyor which is sufficient to burn off residue and oils on the conveyor and the chain in order to clean the same without a need for using detergents or water. The heat is sufficiently intense that most of the contamination on the chain and on the conveyor is vaporized and discharged with the exhaust gases. However, in order to complete the cleaning process, a separate brush unit 22 is provided downstream of the enclosure 16. This brush unit is shown in greater detail in FIGS. 3 and 4.

Brush unit 16 includes a frame 60 through which the conveyor 14 may pass in its path of travel. The frame 16 supports on opposite sides thereof a pair of pivotally mounted support arms 62, 64. These arms are pivotally mounted on transverse shafts 62', 64', in any convenient manner upon vertical support elements 66. The support arms 62, 64 are respectively connected to pneumatic control cylinders 66, 68 which enable the arms to be pivoted on their shafts 62', 64' towards and away from the path of travel of the conveyor 16.

Figure 3:
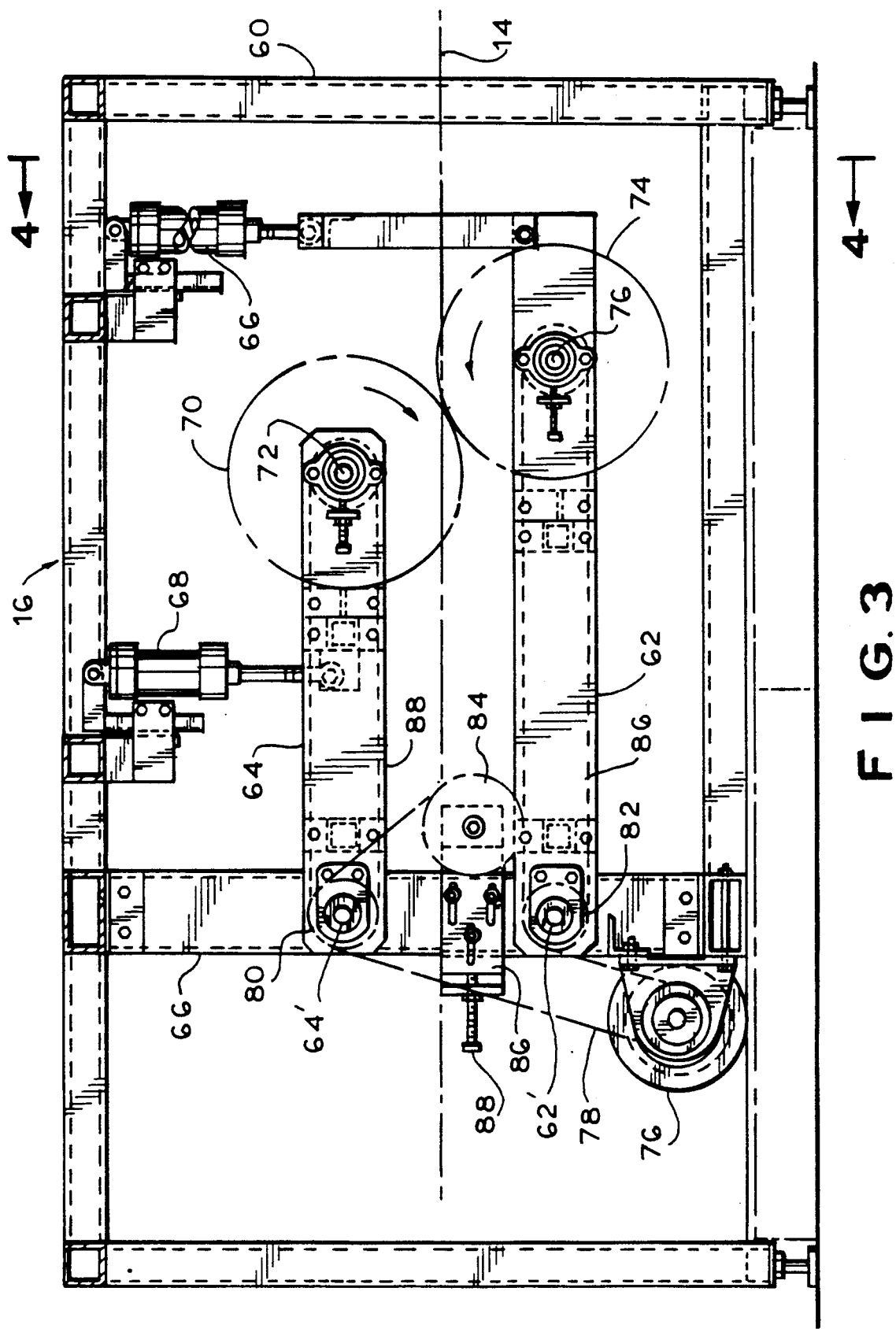
FIG. 3 is a side elevational view of the brush unit used in the system of the present invention.
Figure 4:
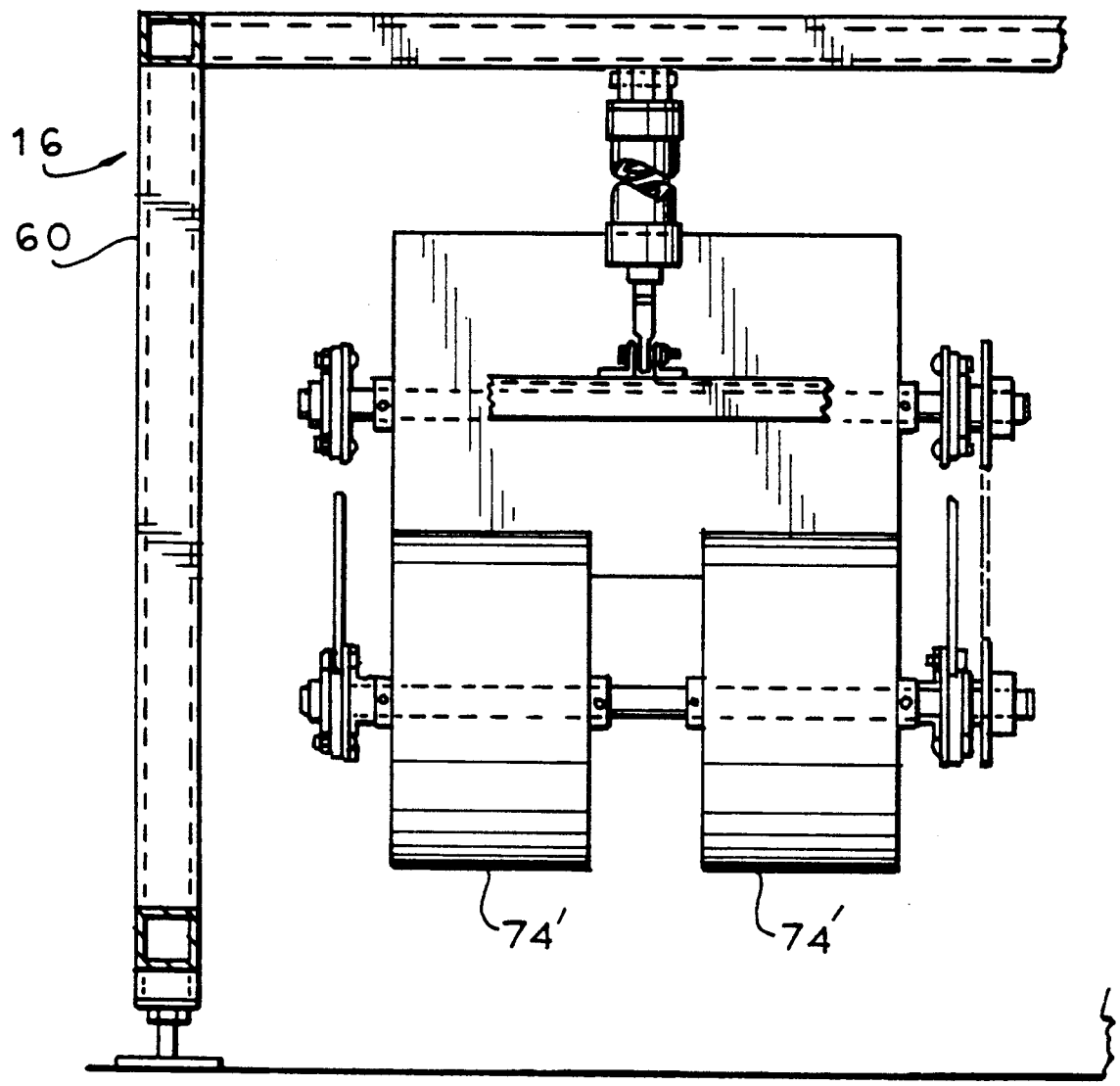
FIG. 4 is a sectional view taken along lines 4—4 of FIG. 3.

A wire brush roller 24 is rotatably mounted on a shaft 72 extending between each of the arms 64, above the path of travel of the conveyor 14. Another wire brush 26, which consists of two separate brushes 74', 74", is mounted on a shaft 76 extending between the arms 62. The brushes 74', 74" are spaced laterally apart (see FIG. 4) from each other by a sufficient distance to enable the support and chain for the conveyor grids to pass therebetween. As seen in FIG. 3, in the operative position of the support arm 62, 64, the brushes 24, 26 are located so that their bristles encounter the conveyor 14 and brush against the wire grid to clean carburized residue therefrom.

Preferably, brushes 24, 26 are rotated in a direction illustrated in FIG. 3, to aid in the cleaning process. Rotation of the wire brushes is accomplished by means of an electric drive motor 76 mounted in the frame 60 below the path of travel of the conveyor. The motor 76 drives a chain 78 which engages two sprockets 80, 82 respectively mounted on the shafts 64', 62'. A tensioning sprocket 84 is mounted on a support arm 84 which is adjustably mounted in any convenient manner on the vertical support 66. Thus, for example, by adjusting the jack screw 88, tension in the drive chain 78 can be adjusted.

The sprockets 80, 82 have companion sprockets on opposite sides of their respective shafts 62', 64', which are engaged with chains 86, 88, respectively, which engage sprockets attached to the shafts 76, 72 to drive the brushes 24, 26.

By this arrangement the conveyor grids can be continuously cleaned during operation of the oven. However, since it is not necessary to clean the conveyor at all times, the system is designed to permit the burn-off unit and brushes to be selectively operated. Thus, the burn-off unit may be associated with a timer for sequentially timing its operation along with that of the brush unit. In addition, when the cleaning system is not in operation, the pneumatic RAMs 66, 68 are operated to move the arms 62, 64 away from the conveyor 14 to disengage the rollers from the grids, thereby reducing wear on both the brushes and the grids. Of course, the unit can also be used during a down day when regular maintenance is done on the conveyor.

Although a preferred embodiment of the invention has been described in connection with the accompanying drawings, it would be understood by those skilled in the art that various modifications and changes can be effected therein without departing from the scope or spirit of this invention.

What is claimed is:

1. A bakery oven system including an oven enclosure, endless open conveyor means for conveying bakery products through the oven and including a conveyor section located outside said oven enclosure; said conveyor including a plurality of support grids for bakery products, a grid burn-off unit adjacent said oven enclosure including a separate enclosure through which said conveyor passes and means for applying high heat to at least one side of said conveyor grids in the grid burn-off enclosure at an intensity sufficient for carburizing and burning food product residue on the conveyor grids; and means downstream of said grid burn-off enclosure in the direction of travel of the conveyor for cleaning carburized food product residue remaining on said conveyor and grids off of the conveyor.

2. A bakery oven system as defined in claim 1 wherein said heat applying means comprises at least one gas burner in the grid burn-off enclosure.

3. A bakery oven system as defined in claim 2 wherein said at least one gas burner is located either above or below the path of travel of the conveyor.

4. A bakery oven system as defined in claim 3 including heat reflector means located on the side of the path of travel of the conveyor opposite said burner.

5. A bakery oven system as defined in claim 2 including a plurality of gas burners located above the path of travel of the conveyor.

6. A bakery oven system as defined in claim 5 including heat reflector means located below the path of travel of the conveyor and beneath said burner means.

7. A bakery oven system as defined in claim 6 wherein said plurality of burners comprise three high capacity burners having a firing rate per unit of 540,000 BTU/hr. maximum.

8. A bakery oven system as defined in claim 1 wherein said cleaning means comprises wire brush means for brushing carburized material off the conveyor.

9. A bakery oven as defined in claim 8 wherein said wire brush means includes at least a pair of wire brushes respectively located above and below the path of travel of the conveyor.

10. A bakery oven system as defined in claim 9 including means for moving said brushes into and out of engagement with said conveyor.

11. An oven grid cleaning unit for a bakery conveyor including a plurality of open grids forming the conveyor support surface, said unit comprising a burn-off enclosure having inlet and outlet openings formed therein through which said bakery conveyor grids may pass in the conveyor's path of travel, means within said enclosure for applying high heat to conveyor grids passing through said enclosure at an intensity sufficient to carburize and burn off oil and food product residue on the conveyor; and means downstream of said grid burn-off enclosure in the direction of travel of the conveyor for brushing the carburized material off of the conveyor grids.

12. An oven grid cleaning unit as defined in claim 11 wherein said heat applying means comprises at least one gas burner in the enclosure.

13. An oven grid cleaning unit as defined in claim 12 wherein said gas burner is located above the path of travel of the conveyor and heat reflecting means is located beneath the burner below said path of travel.

14. An oven grid cleaning unit as defined in claim 13 wherein said heat reflecting means is a steel plate.

15. An oven grid cleaning unit as defined in claim 14 wherein said burner has a firing rate of 540,000 BTU/hr. maximum.

16. An oven grid cleaning unit as defined in claim 11 wherein said cleaning means comprises wire brush means for brushing carburized material off the conveyor.

17. An oven grid cleaning unit as defined in claim 16 wherein said wire brush means includes at least a pair of wire brushes respectively located above and below the path of travel of the conveyor.

18. An oven grid cleaning unit as defined in claim 17 including means for moving said brushes into and out of engagement with said conveyor.

19. An oven grid cleaning unit for an open bakery conveyor comprising an enclosure having inlet and outlet openings formed therein through which a bakery conveyor may pass in its path of travel, means for applying high heat to a conveyor passing through said enclosure at an intensity sufficient to carburize and burn off oil and food residue on the conveyor including at least one gas burner located above the path of travel of the conveyor and directed downwardly towards the conveyor and heat reflecting plate means located beneath the burners and below the side of the conveyor opposite said burners.

20. An oven grid cleaning unit as defined in claim 19 wherein said heat reflecting means is a steel plate.

21. An oven grid cleaning unit as defined in claim 20 including three gas burners each having a firing rate of 540,000 BTU/hr. maximum.

22. A bakery oven system including an oven enclosure, endless open conveyor means for conveying bakery products through the oven and including a conveyor section located outside said oven enclosure; said conveyor including a plurality of support grids for bakery products, a grid burn-off unit adjacent said oven enclosure including a separate enclosure through which said conveyor passes and means for applying high heat to said conveyor grids comprising a plurality of high heat intensity gas burners in said separate enclosure and above the path of travel of the conveyor to direct heat to said grids at an intensity sufficient for carburizing and burning food residue on the conveyor grids and heat reflector means on the side of the path of travel of the conveyor opposite said burners for reflecting heat back to the grids to aid in carburizing said food products, and wire brush means downstream of said grid burn-off enclosure, in the direction of travel of the conveyor, for brushing carburized material off of the conveyor.

* * * * *